US011353567B2

(12) United States Patent
Hustava et al.

(10) Patent No.: US 11,353,567 B2
(45) Date of Patent: *Jun. 7, 2022

(54) ULTRASONIC SENSOR HAVING EDGE-BASED ECHO DETECTION

(71) Applicant: SEMICONDUCTOR COMPONENTS INDUSTRIES, LLC, Phoenix, AZ (US)

(72) Inventors: Marek Hustava, Bratislava (SK); Jiri Kantor, Hrusky (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 440 days.

This patent is subject to a terminal disclaimer.

(21) Appl. No.: 16/530,654

(22) Filed: Aug. 2, 2019

(65) Prior Publication Data

US 2020/0271767 A1 Aug. 27, 2020

Related U.S. Application Data

(60) Provisional application No. 62/808,947, filed on Feb. 22, 2019.

(51) Int. Cl.
*G01S 15/931* (2020.01)
*G01S 7/527* (2006.01)
(Continued)

(52) U.S. Cl.
CPC .............. *G01S 7/527* (2013.01); *G01S 7/524* (2013.01); *G01S 15/10* (2013.01)

(58) Field of Classification Search
CPC .......... G01S 7/527; G01S 7/524; G01S 15/10; G01S 15/931
See application file for complete search history.

(56) References Cited

U.S. PATENT DOCUMENTS 5,793,326 A 8/1998 Hofele
5,793,704 A 8/1998 Freger
(Continued)

FOREIGN PATENT DOCUMENTS

CN 111610530 A * 9/2020 ............. G01S 7/527
DE 102009049067 A1 * 4/2011 ............... G01F 1/66
(Continued)

OTHER PUBLICATIONS

DE 102009049067 Translation (Year: 2011).*
(Continued)

*Primary Examiner* — Daniel Pihulic
(74) *Attorney, Agent, or Firm* — Ramey LLP

(57) ABSTRACT

Sensors may employ a constant false alarm rate (CFAR) screening process in combination with edge-based echo detection. In one illustrative embodiment, a sensor controller includes: a transmitter, a receiver, and a processing circuit coupled to the transmitter and to the receiver. The transmitter drives a piezoelectric element to generate acoustic bursts. The receiver senses a response of the piezoelectric element to echoes of each acoustic burst. The processing circuit is operable to apply echo-detection processing to the response by: determining a derivative signal from the response; and detecting an echo based at least in part on a peak in the derivative signal indicating a rising and/or falling edge in the response. Signaling to the electronic control unit may specify a time of flight associated with each edge.

15 Claims, 3 Drawing Sheets

(51) Int. Cl.
*G01S 15/10* (2006.01)
*G01S 7/521* (2006.01)
*G01S 7/524* (2006.01)
*G01S 7/539* (2006.01)

(56) References Cited

U.S. PATENT DOCUMENTS

| | | |
|---|---|---|
| 10,234,549 B2 | 3/2019 | Suchy et al. |
| 10,345,445 B2 | 7/2019 | Hustava et al. |
| 11,163,048 B2 * | 11/2021 | Suchy ................... G01S 15/931 |
| 11,163,049 B2 * | 11/2021 | Hustava ................ G01S 15/931 |
| 2019/0079173 A1 | 3/2019 | Kutej et al. |
| 2019/0079174 A1 | 3/2019 | Kutej et al. |
| 2020/0271767 A1* | 8/2020 | Hustava .................. G01S 7/527 |
| 2020/0326415 A1* | 10/2020 | Hustava .................. G01S 7/527 |
| 2020/0400803 A1* | 12/2020 | Suchy .................... B06B 1/0215 |

FOREIGN PATENT DOCUMENTS

| | | |
|---|---|---|
| DE | 102013226085 B3 | 3/2015 |
| DE | 102017103275 A1 | 8/2018 |
| FR | 3036809 | 12/2016 |
| WO | 2009108786 A1 | 9/2009 |

OTHER PUBLICATIONS

Marek Hustava et al., "Detection of Noise-Induced Ultrasonic Sensor Blindness," U.S. Appl. No. 16/254,882, filed Jan. 23, 2019, 29 pages.

\* cited by examiner

ULTRASONIC SENSOR HAVING EDGE-BASED ECHO DETECTION

CROSS-REFERENCE TO RELATED APPLICATIONS

This application claims the benefit of U.S. Provisional Patent Application No. 62/808,947, filed on Feb. 22 2019, the entire contents of which is incorporated herein by reference.

BACKGROUND

Modern automobiles are equipped with an impressive number and variety of sensors. For example, cars are now routinely equipped with arrays of ultrasonic sensors to monitor distances between the car and any nearby persons, pets, vehicles, or obstacles. Due to environmental "noise" and safety concerns, each of the sensors may be asked to provide tens of measurements each second while the car is in motion. It is important for such sensor arrays to perform reliably, even in environments that change in complex ways. Seemingly small differences, such as the presence or absence of a curb, or even the difference between paved and gravel surfaces, can significantly change the characteristic reflection of a pole, bollard, or other slim obstacle. Previous attempts to identify the environment and responsively tailor the detection process have proven to be computationally prohibitive and/or inadequate.

SUMMARY

Accordingly, there are disclosed herein various sensors, sensor controllers, and sensor control methods employing a constant false alarm rate (CFAR) screening process in combination with edge-based echo detection. In one illustrative embodiment, a sensor controller includes: a transmitter, a receiver, and a processing circuit coupled to the transmitter and to the receiver. The transmitter drives a piezoelectric element to generate acoustic bursts. The receiver senses a response of the piezoelectric element to echoes of each acoustic burst. The processing circuit is operable to apply echo-detection processing to the response by: determining a derivative signal from the response; and detecting an echo based at least in part on a peak in the derivative signal indicating a falling edge in the response.

In another illustrative controller embodiment, the processing circuit is operable to apply echo-detection processing to the response by: determining a derivative signal from the response; and detecting echoes based at least in part on peaks in the derivative signal indicating edges in the response.

In an illustrative method embodiment, a piezo-electric based sensor is operated by: driving a piezoelectric transducer to generate a burst of acoustic energy during an actuation interval; during a measurement interval following the actuation interval, obtaining a response of the piezoelectric transducer; and processing the response to sense echoes of the burst. The processing includes: determining a derivative signal from the response; and detecting echoes based at least in part on peaks in the derivative signal indicating edges in the response.

Each of the foregoing embodiments may be employed together with any one or more of the following optional features: 1. detecting an echo is further based on: comparing the response to an adaptive threshold to produce a comparator signal; and detecting an edge in the comparator signal. 2. the processing further includes deriving the adaptive threshold from the response signal using a constant false alarm rate (CFAR) process. 3. the derivative signal is determined by: forming a difference signal between the response signal and a delayed response signal; taking an absolute value of the difference signal; and applying a local filter to the absolute value of the difference signal. 4. the derivative signal is further determined by: applying a background filter to the absolute value of the difference signal; and taking a ratio of an output from the local filter to an output of the background filter. 5. the processing further includes: generating a pulse on an I/O line to signal a time of flight of the echo. 6. the processing further includes: generating a data frame that includes, for each echo detected in response to an acoustic burst, a time of flight for a falling edge of that echo. 7. the processing further includes signaling an electronic control unit to indicate one or more times of flight associated with each echo, the one or more times of flight each corresponding to one of said peaks in the derivative. 8. the processing further includes signaling two times of flight associated with each echo, with a first time of flight corresponding to a rising edge peak and a second time of flight corresponding to a falling edge peak. 9. measuring peak amplitude of each echo. 10. adjusting the one or more times of flight associated with each echo based at least in part on the peak amplitude of that echo. 11. adjusting is based on a ratio between the peak amplitude of that echo and a peak in the derivative for an edge of that echo.

DETAILED DESCRIPTION

It should be understood that the drawings and following description do not limit the disclosure, but on the contrary, they provide the foundation for one of ordinary skill in the art to understand all modifications, equivalents, and alternatives falling within the scope of the claim language.

Figure 1:
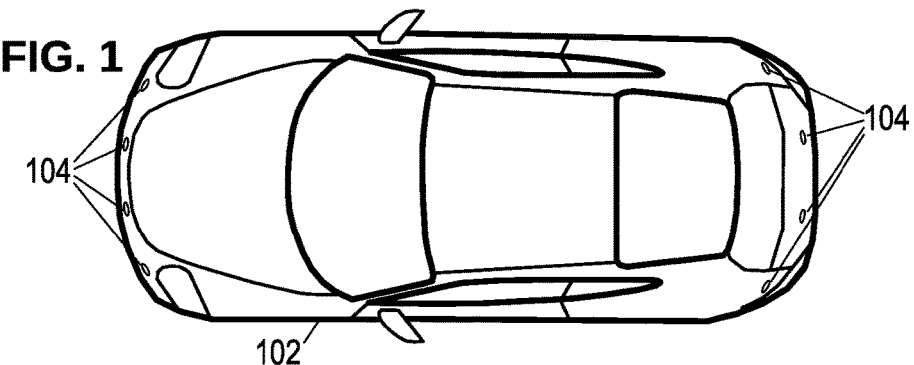
FIG. 1 is an overhead view of an illustrative vehicle equipped with parking-assist sensors.

As an illustrative usage context, FIG. 1 shows a vehicle 102 equipped with a set of ultrasonic parking-assist sensors 104. The number and configuration of sensors in the sensor arrangement varies, and it would not be unusual to have six sensors on each bumper with two additional sensors on each side for blind-spot detectors. The vehicle may employ the sensor arrangement for detecting and measuring distances to objects in the various detection zones, potentially using the sensors for individual measurements as well as cooperative (e.g., triangulation, multi-receiver) measurements.

The ultrasonic sensors are transceivers, meaning that each sensor can transmit and receive bursts of ultrasonic sound. Emitted bursts propagate outward from the vehicle until they encounter and reflect from an object or some other form of acoustic impedance mismatch. The reflected bursts return to the vehicle as "echoes" of the emitted bursts. The times between the emitted bursts and received echoes are indicative of the distances to the reflection points. In many systems, only one sensor transmits at a time, though all of the sensors may be configured to measure the resulting echoes. However multiple simultaneous transmissions can be supported through the use of orthogonal waveforms or transmissions to non-overlapping detection zones.

Figure 2:
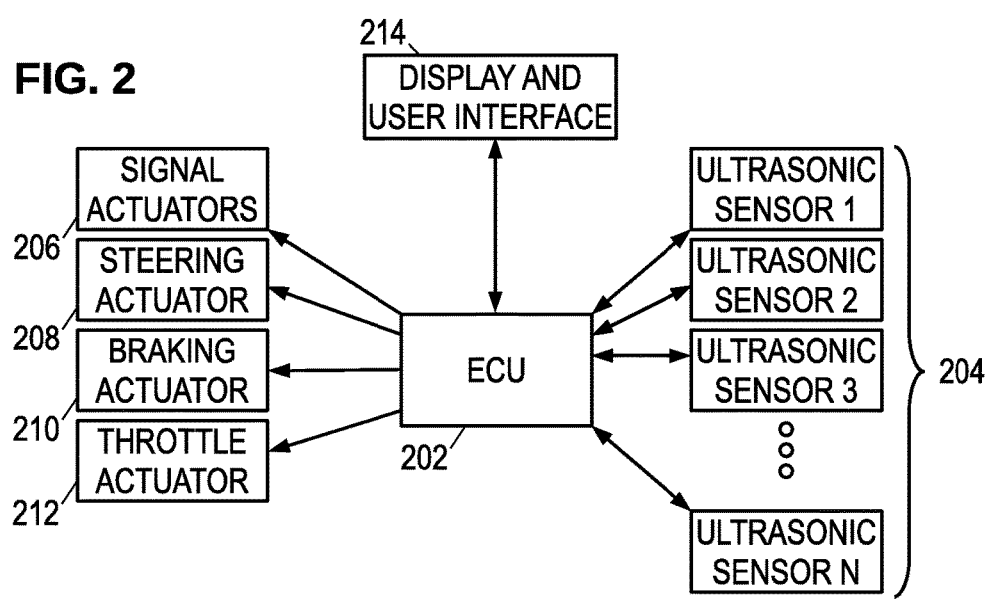
FIG. 2 is a block diagram of an illustrative parking assist system.

FIG. 2 shows an electronic control unit (ECU) 202 coupled to the various ultrasonic sensors 204 as the center of a star topology. Of course, other topologies including serial, parallel, and hierarchical (tree) topologies, are also suitable and contemplated for use in accordance with the principles disclosed herein. To provide automated parking assistance, the ECU 202 may further connect to a set of actuators such as a turn-signal actuator 206, a steering actuator 208, a braking actuator 210, and throttle actuator 212. ECU 202 may further couple to a user-interactive interface 214 to accept user input and provide a display of the various measurements and system status. Using the interface, sensors, and actuators, ECU 202 may provide automated parking, assisted parking, lane-change assistance, obstacle and blind-spot detection, and other desirable features.

One potential sensor configuration is now described with reference to FIG. 3. (Other communication and power supply techniques such as those provided in the DSI3, LIN, and CAN standards, would also be suitable and are contemplated for use in accordance with the principles disclosed herein.) Besides the two power terminals (Vbat and GND) shown in the embodiment of FIG. 3, each of the illustrative ultrasonic sensors is only connected to the ECU 202 by a single input/output ("I/O" or "I/O") line. The I/O line may be biased to the supply voltage (the "de-asserted" state) by a pull-up resistor when it is not actively driven low (the "asserted" state) by the ECU 202 or by the sensor controller 302. The communication protocol is designed to have only one of the two controllers (ECU 202 or sensor controller 302) asserting the I/O line at any given time.

The sensor controller 302 includes an I/O interface 303 that, when placed in a recessive mode, monitors the I/O line for assertion by the ECU 202 and, when placed in a dominant mode, drives the state of the I/O line. The ECU communicates a command to the sensor by asserting the I/O line, the different commands being represented by assertions of different lengths. The commands may include a "send and receive" command, a "receive only" command, and a "data mode" command.

The sensor controller 302 includes a core logic 304 that operates in accordance with firmware and parameters stored in nonvolatile memory 305 to parse commands from the ECU and carry out the appropriate operations, including the transmission and reception of ultrasonic bursts. To transmit an ultrasonic burst, the core logic 304 is coupled to a transmitter 306 which, with a suitably modulated local oscillator signal from a voltage controlled oscillator 307, drives a set of transmit terminals on the sensor controller 302. The transmitter terminals are coupled via a transformer M1 to a piezoelectric element PZ. The transformer M1 steps up the voltage from the sensor controller (e.g., 12 volts) to a suitable level for driving the piezoelectric element (e.g., tens of volts). The piezoelectric element PZ has a resonance frequency that is tuned to a desirable value (e.g., 48 kHz) with a parallel capacitor C3, and has a resonance quality factor (Q) that is tuned with a parallel resistor R1. One illustrative purpose of the tuning capacitor and tuning resistor is to tune the parallel resonance frequency close to the series resonant frequency of the piezoelectric element.

As used herein, the term "piezoelectric transducer" includes not only the piezoelectric element, but also the supporting circuit elements for tuning, driving, and sensing, the piezoelectric element. In the illustrative embodiment, these supporting elements are the transformer M1, the tuning resistor and tuning capacitor, and the DC-isolation capacitors. Optionally, output and input capacitance of the transmitter 306 and amplifier 308, respectively, may also be included as parasitic characteristics of the supporting circuit elements considered to be part of the transducer. However, the use of the term "piezoelectric transducer" does not necessarily require the presence of any supporting circuit elements, as a piezoelectric element may be employed alone without such supporting elements.

A pair of DC-isolation capacitors C1, C2 couple the piezoelectric element to the sensor controller's pair of receive terminals to protect against high voltages. Further protection is provided with internal voltage clamps on the receive terminals. Such protection may be desired for the intervals when the piezoelectric element is transmitting. As the received echo signals are typically in the millivolt or microvolt range, a low-noise amplifier 308 (also referred to herein as a "front-end amplifier") amplifies the signal from the receive terminals. An optional mixer 309 multiplies the amplified receive signal with the local oscillator signal to downconvert the modulated signal to baseband before it is digitized and processed by a digital signal processor (DSP) 310 with an integrated analog-to-digital converter (ADC).

DSP 310 applies programmable methods to monitor the piezoelectric transducer during the transmission of a burst, and to detect any echoes and measure their parameters such as time-of-flight, duration, and peak amplitude. Such methods may employ threshold comparisons, minimum intervals, peak detections, zero-crossing detection and counting, noise level determinations, and other customizable techniques tailored for improving reliability and accuracy. The DSP 310 may further process the amplified receive signal to analyze characteristics of the transducer, such as resonance frequency and quality factor, and may further detect transducer fault states.

Commands received via the I/O line trigger the core logic 304 to operate the transmitter and receiver and to provide the measurement results to the ECU 202 via the I/O line, as explained further below. In addition to the echo measurements and transducer fault states that may be detected by the DSP 310, the core logic may monitor other sensor conditions such as having the supply voltage "under-voltage" or "over-voltage" while transmitting an ultrasonic burst, thermal shutdown of transmitter, a hardware error, an incomplete power-on reset, or the like. The core logic 304 may detect and classify multiple such transducer fault states and error conditions, storing the appropriate fault codes in internal registers or nonvolatile memory 305.

Figure 4A:
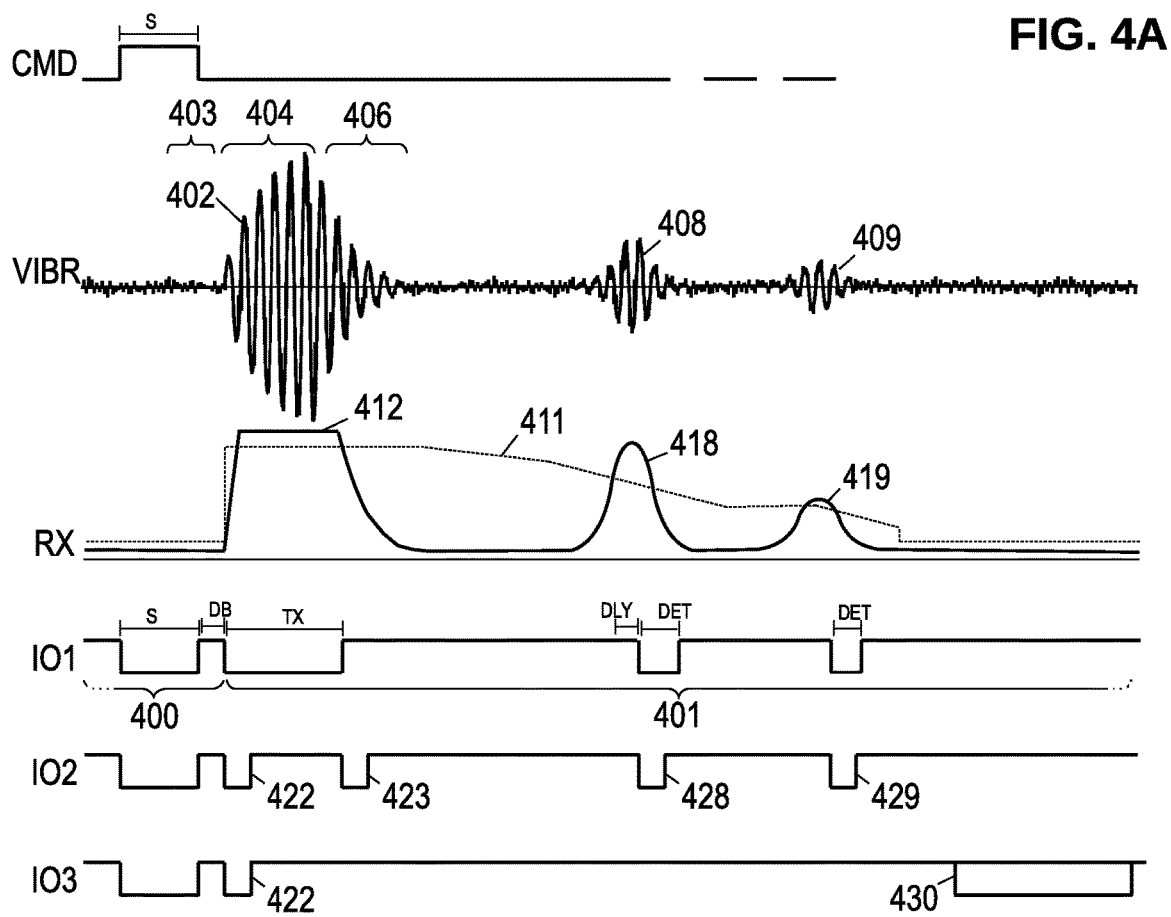
FIG. 4A is a graph relating controller input and output signals for different existing interface standards.

FIG. 4A provides some illustrative signal timing to aid in understanding the operation of the illustrative sensor embodiments, particularly with regard to communication on the I/O line. An ECU formulates a signal pulse "CMD" having a duration that represents a desired command. In this instance the duration is "$T_s$" to represent a "send and receive" command. (Illustrative command pulse durations may be in the 300-1300 microsecond range.)

Signal graphs 101, 102, and 103, show potential uses of the I/O line in accordance with different existing standards, which may be respectively termed "standard", "pulse echo reporting", and "advanced". During a time 400 when the sensor is inactive (i.e., not performing a measurement or otherwise responding to a command from the ECU), the I/O line is high (de-asserted) by default. During this time 400, the ECU is allowed to control the I/O line. As can be seen with each of the signal graphs 101, 102, and 103, the ECU asserts the IO signal by actively driving the line low for the duration representing the command. There is a small propagation delay due to limited slew rates on the I/O line, and a debounce interval ("$T_{DB}$") follows the assertion and de-assertion to ensure that the timing of line's return to battery voltage is deliberate and not a result of transient noise. (Illustrative debounce intervals may be in the 40-80 microsecond range.)

With the lapse of the debounce interval, the sensor controller decodes the command and takes control of the I/O line for a predetermined interval 401 that may depend on the command. For a "send and receive" command, the sensor controller begins the predetermined interval 401 with the transmission of an acoustic burst 402 and retains control until a programmed measurement interval has elapsed. Before discussing the operation of the I/O line during this measurement interval 401, we consider the operation of the piezoelectric transducer and the corresponding amplified receive signal RX.

The operation of the piezoelectric transducer is here represented as a vibration signal VIBR representing mechanical oscillation of the piezoelectric element. (Note that the signal is not shown to scale, as the transmitted burst 402 may be orders of magnitude larger than the echoes 408, 409.) Electrically, the mechanical vibration of the piezoelectric element can be detected as a voltage or a current. The mechanical vibration amplitude increases as the controller 302 drives the transducer (the "driving stage" 404), then decreases after the driving operation is concluded (the "reverberation stage" 406). The controller 302 may employ active and/or passive damping to reduce the duration of the reverberation stage.

Figure 3:
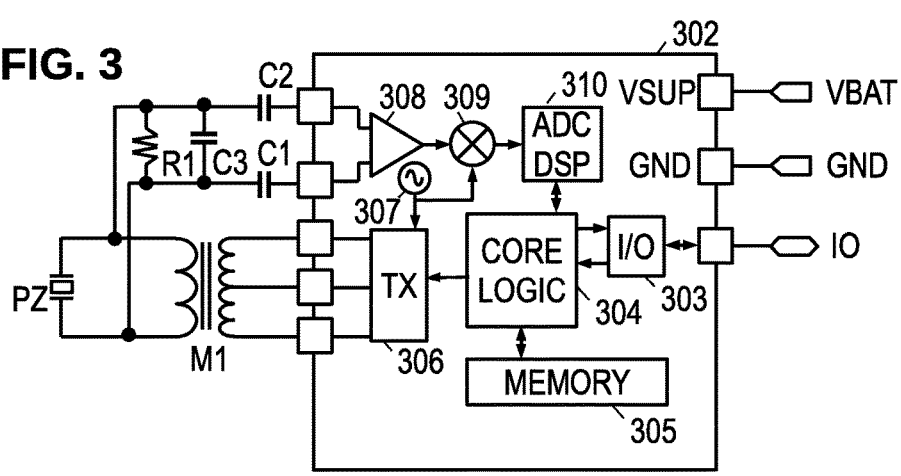
FIG. 3 is a circuit schematic of an illustrative parking-assist sensor.
Figure 4B:
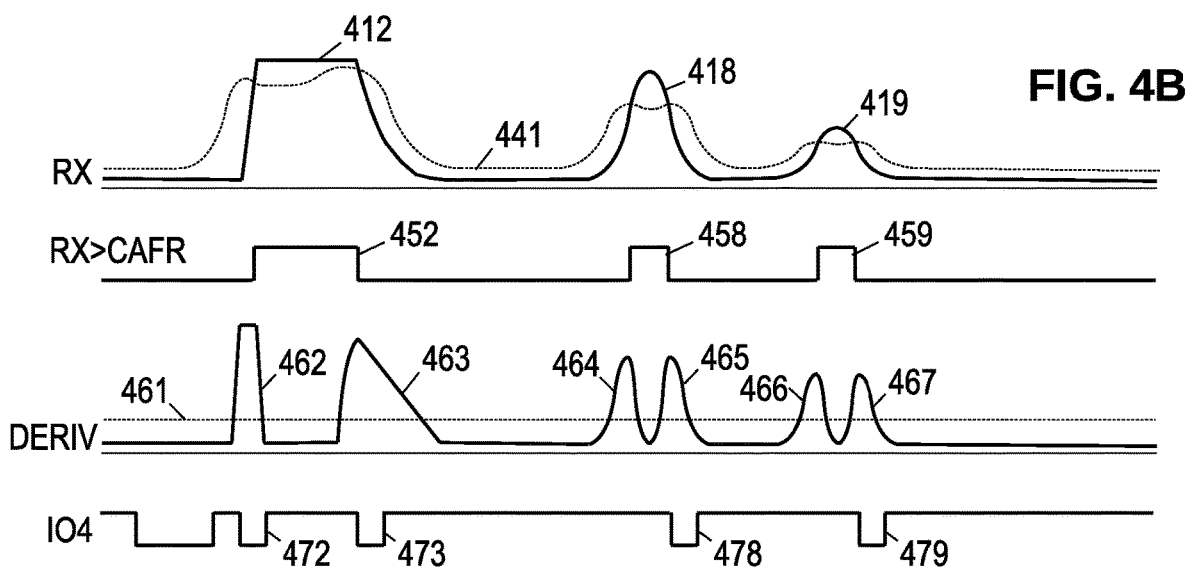
FIG. 4B is a graph of illustrative signals for an enhanced edge-based echo detection process.

In the sensor embodiment of FIG. 3, the vibration is detected as a clamped, amplified version of the secondary voltage VX via amplifier 308. For explanatory purposes the RX signal illustrated in FIG. 4 is a (low-pass filtered) envelope of this clamped, amplified voltage signal, but the amplified oscillatory signal can also be employed.

The sensor controller measures a noise level during a pre-transmit period 403, which may begin one debounce interval after the ECU asserts the I/O line and may end when the transmit burst is sent. The actuation of the transducer for the transmit burst causes the RX signal to saturate. (In at least some implementations, internal voltage clamps on the receive terminals of the sensor controller prevent excessive voltages from reaching amplifier 308). The transmit burst overwhelms the receiver and prevents any meaningful echo measurements from being acquired during this interval. While the receive signal is above a threshold 411 (and/or compliant with other implementation-specific requirements that aren't relevant here), the standard sensor controller drives the I/O line low (101). Thus, the controller asserts the IO signal during the actuation interval $T_{TX}$, which corresponds to the interval 412 where the RX signal exceeds the threshold 411. This assertion during the transmit burst enables the ECU to measure the actuation interval ("$T_{TX}$") of the transducer, enabling it to verify operation of the transducer.

Note that the actuation interval 412 includes not only the drive stage 404 of the acoustic burst generation, but also a portion of the reverberation stage 406 of the acoustic burst. The time required for the reverberation amplitude to drop below threshold 411 is indicative of the losses in the transducer, and accordingly may be used as an indicator of the quality factor (Q).

Once the receive signal falls below a threshold 411, it becomes possible to detect echoes, and the standard I/O line (101) is de-asserted until such time as the sensor controller detects a valid echo 418, 419. The requirements for a valid echo may include, e.g., a minimum time ("$T_{DLY}$") above a threshold 411, the minimum time being equal to or greater than the debounce interval $T_{DB}$. Such a requirement necessarily requires that the assertion of the I/O line in response to an echo be delayed by the minimum time $T_{DLY}$. The assertion lasts for a duration ("$T_{DET}$") equal to the detected length of the echo burst (duration above the threshold 411). In at least some embodiments, multiple echoes may be detected and represented by respective assertions of the I/O line. At the end of the programmed measurement interval 401, the standard sensor controller 302 releases control of the I/O line.

Sensors employing a pulse reporting protocol (102) employ fixed pulse lengths (usually $T_{DB}$) to report events including a report pulse 422 to indicate initiation of the transmit burst 402, a report pulse 423 to indicate the end of the actuation period, and a report pulse 428, 429 for each detected echo 418, 419.

Sensors employing an advanced I/O line protocol (103) employ a fixed length pulse 422 to indicate the beginning of the measurement window 401, and a digital data frame 430 to report burst and echo parameters. The burst parameters may include pre-transmit noise level and the length of the actuation period. The echo parameter may include time of flight, width, and peak amplitude for each detected echo.

A common factor used by the sensor controllers for each of the protocols is the echo detection method, which relies on a predetermined threshold 411. However, echo envelopes fluctuate in complex ways based on obstacle shape and surroundings, and the fixed-threshold approach is sensitive to such variation, limiting the accuracy of obstacle position determinations. Accordingly, there is disclosed herein an enhanced edge-based echo detection process.

FIG. 4B again shows the receive signal RX as compared with a dynamic threshold signal 441 derived using a constant false alarm rate (CFAR) process. A number of CFAR variations exist offering different tradeoffs between performance and computational complexity, but in each case the processes are intended to keep the probability of detecting a false echo at a relatively constant level even in the presence of varying background noise. The CFAR threshold 441 increases in the presence of strong signals and/or noise, and decreases when only weak signals or noise are present.

When a comparator compares the RX signal to the CFAR threshold 441 in this example, it produces a pulse 452 to indicate the transmit burst and two later pulses 458, 459 to indicate the presence of potential echoes 418 and 419. To confirm that the pulses indicate echoes and not noise, the contemplated detection process further estimates a normalized derivative (DERIV) of the RX envelope signal. In at least some contemplated embodiments, the RX envelope is a digital signal. The sensor controller delays the RX signal by one sample interval and subtracts it from the undelayed RX signal to obtain an estimated derivative. The estimated derivative may be normalized by taking the absolute value of each difference and running it through two filters. A first, local moving average filter determines a sum or average of absolute differences within a small window, the size of which is optimized for accuracy vs. noise. A second, background filter determines a weighted sum of absolute differences over a window that is at least several times larger than that of the local filter. The second filter may be a recursive filter that provides exponential weighting of the past absolute differences. Each of the filters is preferably programmable to match the bandwidth of filters used for detecting potential echoes. The normalized derivative (DERIV) is the ratio of the first (local) filter output to the second (background) filter output, and it is compared to a predetermined threshold 461. The DERIV curve includes a peak 462 indicating the rising edge of burst 412, a peak 463 indicating the falling edge of burst 412, peaks 464 and 465 indicating rising and falling edges of echo 418, and peaks 466 and 467 representing rising and falling edges of echo 419. In some alternative embodiments, the background filter is omitted and the filtered derivative signal (rather than the ratio) is compared to the predetermined threshold. Other alternative embodiments use a variable, time-dependent threshold for comparison with the filtered or normalized derivatives.

When the sensor controller identifies the presence of a rising or falling edge of an echo pulse in combination with the receive signal exceeding the CFAR threshold, it reports the presence of an echo to the ECU. In at least some contemplated systems, the falling edges tend to be more abrupt and hence may serve as better indicators of echo presence and position. Accordingly, the illustrated I/O line signal (104) employs the pulse reporting protocol with fixed-length pulses positioned beginning at the falling-edge peaks of the normalized derivative. Pulse 472, as with pulse 422, indicates the beginning of a transmit burst. Pulse 473 indicates the falling edge of the transmit burst 412. Pulses 478 and 479 indicate the falling edges of the echoes 418, 419. The time of flight calculation for echoes 418, 419, may take the position of pulse 473 as the "zero" point.

In alternative embodiments, the fixed pulses are positioned beginning at the peak of the derivative for the rising edge of the echo pulses. Where the rising edge is reported, the time of flight calculation may take the beginning of the transmit burst or measurement window 401 as the "zero" point.

In other alternative embodiments, the "standard" I/O line protocol is employed with pulses beginning at the rising-edge peak of the derivative and ending at the falling-edge peak of the derivative.

Alternatively, the "advanced" I/O line protocol may be employed to report the time of flight, width, and peak amplitude of each echo detected in accordance with the foregoing principles. Reporting of the detected echoes can alternatively be performed using other bus protocols such as CAN, LIN, DSI3, and PSI5.

In each of these embodiments, there may be requirements for the receive signal to exceed the threshold for a minimum amount of time or for the derivative to exceed the threshold for a minimum amount of time, and if so, the position of the transitions in the I/O line signal may be delayed accordingly. In each of these embodiments, the sensor controller may also or alternatively adjust the time of flight to compensate for any dependence on the echo amplitude as discussed further below.

In one preferred variation of the "advanced" I/O line protocol, the data frame 430 includes, for each detected echo: (1) a time of flight indicating the position of the rising edge derivative peak; (2) a time of flight indicating the position of the falling edge derivative peak; and (3) an amplitude of the echo peak.

Figure 5:
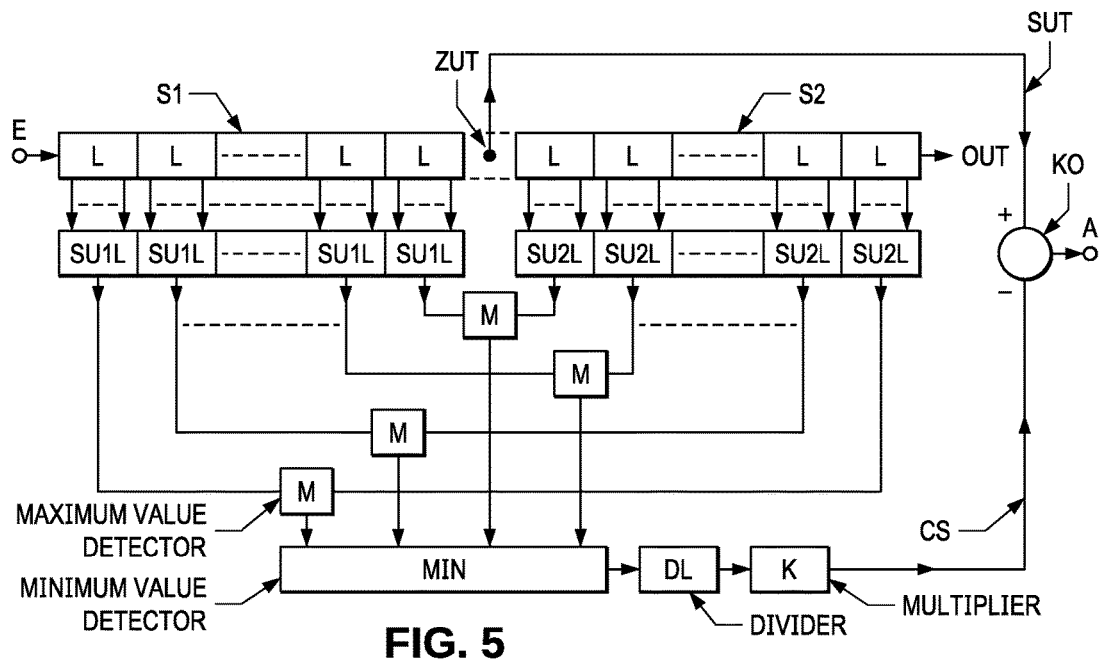
FIG. 5 is an illustrative CFAR implementation.

FIG. 5 is an illustrative implementation of a CFAR process from U.S. Pat. No. 5,793,326 ("Hofele") which may be adapted for use by the sensor controller. A shift register having i blocks, each block having L samples of receive signal envelope RX, shifts to accept new sample blocks from input E. The block in the center is designated the cell under test ("ZUT"), while the blocks to the left of center form sub-register S1 and the blocks to the right form sub-register S2. A summing circuit determines for each block the sum of samples within that block. A set of maximum value detectors compares the sums pairwise, working outwards from the cell under test, each detector forwarding the maximum sum. A minimum value detector compares the maxima to determine the smallest one. A divider scales the smallest maximum by L or some other fixed value for normalization, before a multiplier K weights the normalized value, optionally adding an offset, to determine a CFAR threshold value. Comparator KD compares each of the samples in the cell under test to the threshold to determine whether a potential echo peak is present. As previously mentioned, a number of variations exist and would also be suitable for use, albeit with different tradeoffs between performance and computational complexity. One variation locates the ZUT at the right side of the shift register (for detecting rising edges) or at the left side of the shift register (to detect falling edges).

Figure 6A:
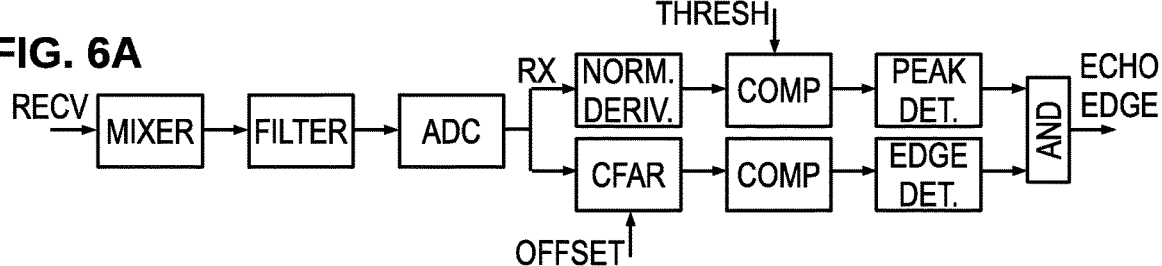
FIGS. 6A and 6B are block diagrams of an illustrative edge-based echo detection process.
Figure 6B:
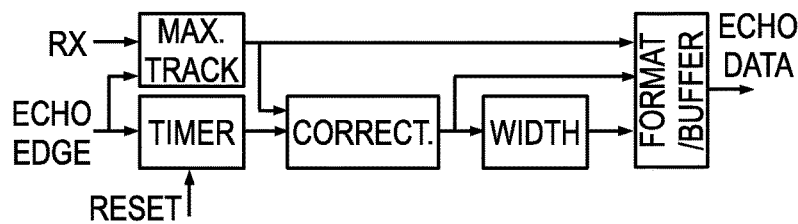

FIGS. 6A-6B are block diagrams of an illustrative edge-based echo detection process that may be implemented by the sensor controller. A mixer downconverts the receive signal to baseband or near-baseband. A filter blocks the undesired frequencies from the downconversion process, and may further perform rectification and low-pass filtering to obtain the envelope of the receive signal. An analog-to-digital converter ADC digitizes the receive signal envelope, which is directed along two branches.

Along one branch, a derivation element ("Norm. Deriv.") determines the normalized derivative as discussed previously. A comparator compares the normalized derivative to a programmable threshold value, zeroing any signal below the threshold. A peak detector identifies peaks in the normalized derivative where it is above the threshold. In some implementations, the peak detector generates a fixed-length pulse to indicate the position of each peak.

Along the other branch, a CFAR element derives a CFAR threshold from the RX signal, the threshold optionally including a programmable offset. A comparator compares the RX signal to the CFAR threshold, producing an output signal that is asserted when the RX signal is above the threshold and deasserted otherwise. An edge detector detects downward transitions of the comparator output, upward transitions, or both, depending on the configuration of the sensor controller. In some implementations, the edge detector generates a fixed-length pulse to indicate the position of each edge.

A logical AND asserts an echo edge detection signal when both the RX signal crosses the CFAR threshold and a peak is detected in the normalized derivative. The AND element may be configured to generate a fixed length pulse to indicate when the inputs have been simultaneously asserted.

Figure 7:
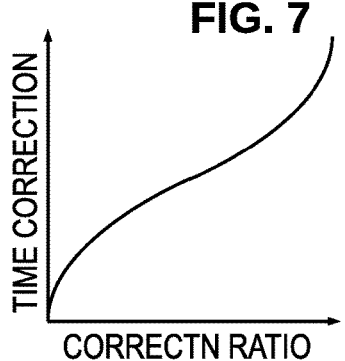
FIG. 7 is a graph for an illustrative time correction look up table.

In FIG. 6B, the echo edge detection signal is routed to both a timer and a peak amplitude element ("Max Track"). The timer is reset with each transmit burst, and with each assertion of the echo edge signal, it forwards a time of flight value to an (optional) correction element. The peak amplitude element identifies the peak amplitude of the RX envelope between assertions of the echo edge signal. Based on the peak amplitude, the correction element may adjust the time of flight values to reduce or eliminate any dependence of the time of flight on the echo amplitude. FIG. 7 shows an illustrative time-of-flight correction function that may be implemented by a look-up table. The lookup table associates a delta to be added or subtracted from the time of flight value based on the amplitude of the echo, or more preferably, on the ratio between the peak of the normalized derivative and the peak amplitude of the echo.

Returning to FIG. 6B, the optionally-corrected time of flight may be provided to a width determination unit which calculates echo pulse widths. A framer ("Format/Buffer") element collects the peak amplitude, optionally-corrected time of flight(s), and echo width values for each detected echo into a data frame for communication to the ECU.

Though the operations shown and described above are treated as being sequential for explanatory purposes, in practice the process may be carried out by multiple integrated circuit components operating concurrently and perhaps even speculatively to enable out-of-order operations. The sequential discussion is not meant to be limiting. Further, the foregoing description has presumed the use of an I/O line bus, but other bus embodiments including LIN, CAN and DSI3 are contemplated. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A controller for a piezoelectric transducer, the controller comprising:
   a transmitter to drive a piezoelectric element to generate acoustic bursts;
   a receiver to sense a response of the piezoelectric element to echoes of each acoustic burst; and
   a processing circuit coupled to the transmitter and to the receiver, the processing circuit operable to apply echo-detection processing to said response, said processing including:
      determining a derivative signal from the response; and
      detecting an echo by:
         deriving an adaptive threshold from the response using a constant false alarm rate (CFAR) process,
         comparing the response to the adaptive threshold to produce a comparator signal; and
         detecting an edge in the comparator signal with a corresponding peak in the derivative signal indicating a falling edge in the response.

2. The controller of claim 1, wherein the derivative signal is determined by:
   forming a difference signal between the response signal and a delayed response signal;
   taking an absolute value of the difference signal; and
   applying a local filter to the absolute value of the difference signal.

3. The controller of claim 2, wherein the derivative signal is further determined by:
   applying a background filter to the absolute value of the difference signal; and
   taking a ratio of an output from the local filter to an output of the background filter.

4. The controller of claim 1, wherein said processing further includes: generating a pulse on an I/O line to signal a time of flight of the echo.

5. The controller of claim 1, wherein said processing further includes: generating a data frame that includes, for each echo detected in response to an acoustic burst, a time of flight for a falling edge of that echo.

6. A controller for a piezoelectric transducer, the controller comprising:
   a transmitter to drive a piezoelectric element to generate acoustic bursts;
   a receiver to sense a response of the piezoelectric element to echoes of each acoustic burst; and
   a processing circuit coupled to the transmitter and to the receiver, the processing circuit operable to apply echo-detection processing to said response, said processing including:
      determining a derivative signal from the response; and
      detecting echoes by:
         deriving an adaptive threshold from the response using a constant false alarm rate (CFAR) process,
         comparing the response to the adaptive threshold to produce a comparator signal; and
         detecting edges in the comparator signal having corresponding peaks in the derivative signal that indicate edges in the response.

7. The controller of claim 6, wherein said processing further includes signaling an electronic control unit to indicate one or more times of flight associated with each echo, the one or more times of flight each corresponding to one of said peaks in the derivative.

8. The controller of claim 7, wherein said signaling indicates two times of flight associated with each echo, with a first time of flight corresponding to a rising edge peak and a second time of flight corresponding to a falling edge peak.

9. The controller of claim 7, wherein said processing further includes:
   measuring peak amplitude of each echo; and
   adjusting the one or more times of flight associated with each echo based at least in part on the peak amplitude of that echo.

10. The controller of claim 9, wherein said adjusting is based on a ratio between the peak amplitude of that echo and a peak in the derivative for an edge of that echo.

11. The controller of claim 7, wherein the derivative signal is determined by:
    forming a difference signal between the response signal and a delayed response signal;
    taking an absolute value of the difference signal; and
    applying a local filter to the absolute value of the difference signal.

12. The controller of claim 11, wherein the derivative signal is further determined by:
    applying a background filter to the absolute value of the difference signal; and
    taking a ratio of an output from the local filter to an output of the background filter.

13. A method of operating a piezoelectric-based sensor, the method comprising:
    driving a piezoelectric transducer to generate a burst of acoustic energy during an actuation interval;
    during a measurement interval following the actuation interval, obtaining a response of the piezoelectric transducer; and
    processing the response to sense echoes of the burst, said processing including:
       determining a derivative signal from the response; and
       detecting echoes by:
          comparing the response to a constant false alarm rate (CFAR) threshold to produce a comparator signal; and
          detecting edges in the comparator signal having corresponding peaks in the derivative signal indicating edges in the response.

14. The method of claim 13, further comprising: signaling an electronic control unit to indicate a time of flight associated with each echo, the time of flight corresponding to a falling edge peak in the derivative.

15. The controller of claim 13, further comprising: signaling an electronic control unit to indicate two times of flight associated with each echo, with a first time of flight corresponding to a rising edge peak and a second time of flight corresponding to a falling edge peak.

* * * * *